(12) United States Patent
Elsasser et al.

(10) Patent No.: US 10,563,970 B2
(45) Date of Patent: Feb. 18, 2020

(54) SMART CABLE ENCLOSURE INCORPORATING MECHANICAL STRAIN, MEASUREMENT, STORAGE, TRANSMISSION AND INTERPRETATION

(71) Applicant: International Business Machines Corporation, Armonk, NY (US)

(72) Inventors: Ryan Elsasser, Poughkeepsie, NY (US); David Fratzke, Georgetown, TX (US); Suraush Khambati, Poughkeepsie, NY (US); Khaalid P. J. McMillan, Wappingers Falls, NY (US); Noah Singer, Rockland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 15/941,362

(22) Filed: Mar. 30, 2018

(65) Prior Publication Data
US 2019/0301846 A1    Oct. 3, 2019

(51) Int. Cl.
*G01L 1/16* (2006.01)
*G01B 7/16* (2006.01)
(Continued)

(52) U.S. Cl.
CPC .......... *G01B 7/16* (2013.01); *G01L 1/16* (2013.01); *G01L 5/101* (2013.01); *H01B 7/02* (2013.01); *H01B 7/04* (2013.01); *H01B 7/0823* (2013.01)

(58) Field of Classification Search
CPC .... H01B 7/02; H01B 7/04; G01B 7/16; G01L 1/16
See application file for complete search history.

(56) References Cited

U.S. PATENT DOCUMENTS 7,221,619 B1 *  5/2007  George ............... G01V 1/38
367/16
8,953,915 B2 *  2/2015  Sarchi ............... G01K 11/32
385/101

(Continued)

FOREIGN PATENT DOCUMENTS

GB    2401738 A    11/2004

OTHER PUBLICATIONS

Kluth et al.; "Application of Temperature Sensing and Dynamic Strain Monitoring to Subsea Cable Technology"; Jicable.com, 2007; Sensornet & PowerSure Tech., Ltd.; 4 pages.

(Continued)

*Primary Examiner* — Jamel E Williams
(74) *Attorney, Agent, or Firm* — Cantor Colburn LLP; Tihon Poltavets

(57) ABSTRACT

An electronic cable is provided that is able to measure, store, transmit, and/or interpret mechanical strains that are applied to the electronic cable. The electronic cable includes a centrally located piezoelectric fiber sensor, two or more flex sensors, a battery, a memory, and a microprocessor. The piezoelectric fiber sensor is configured to produce voltage readings that are proportional to tensile loads experienced by the electronic cable in the axial direction over time. The flex sensors are arranged radially external to the piezoelectric fiber sensor, and are configured to output voltage readings that are proportional to lateral loads experienced by the electronic cable in a radial direction over time. The battery is configured to supply a current to the piezoelectric fiber sensor and flex sensors. The microprocessor is configured to store the voltage output readings in the memory.

20 Claims, 10 Drawing Sheets

(51) Int. Cl.
    *H01B 7/04*   (2006.01)
    *G01L 5/101*  (2020.01)
    *H01B 7/02*   (2006.01)
    *H01B 7/08*       (2006.01)

(56) References Cited

U.S. PATENT DOCUMENTS 9,557,232 B2 * 1/2017 Hurley .................... G01L 1/242
2016/0291103 A1 * 10/2016 Van Leeuwen .... G01R 33/3685
2017/0191883 A1 * 7/2017 Wei .......................... G02B 6/00

OTHER PUBLICATIONS

Mell et al.; "The NIST Definition of Cloud Computing—Recommendations of the National Institute of Standards and Technology"; US Department of Commerce—National Institute of Standards and Technology; Sep. 2011; 7 pages.

\* cited by examiner

SMART CABLE ENCLOSURE INCORPORATING MECHANICAL STRAIN, MEASUREMENT, STORAGE, TRANSMISSION AND INTERPRETATION

BACKGROUND

The present invention relates to electronic cables, and more specifically, to smart cable electronic cables that are able to measure, store, transmit, and/or interpret mechanical strains that are applied to the smart electronic cables.

Modern server environments utilize dense configurations of sensitive cables to meet aggressive speed and reliability requirements. These cables have a minimum bend radius below which performance and service life decrease. However, present cables and systems are not able to measure, quantify, and store mechanical strain induced on a cable throughout the cables service life, much less do so locally on the cable without an external power source. Moreover, there is no present mechanism in the art that allows for remote monitoring and deciphering between cable bending strains and axial direction strains.

SUMMARY

Embodiments of the present invention provide a smart electronic cable that is able to measure, store, transmit, and/or interpret mechanical strains that are applied to the electronic cable. A non-limiting example of the electronic cable includes a centrally located piezoelectric fiber sensor, two or more flex sensors, a battery, a memory, and a microprocessor. The piezoelectric fiber sensor has a length that longitudinally extends along at least a portion of the electronic cable in an axial direction. The piezoelectric fiber sensor is configured to produce voltage readings that are proportional to tensile loads experienced by the electronic cable in the axial direction over time. The flex sensors are arranged radially external to the piezoelectric fiber sensor. Each flex sensor has a length that longitudinally extends along at least a portion of the electronic cable in the axial direction. The flex sensors are configured to output voltage readings that are proportional to lateral loads experienced by the electronic cable in a radial direction over time. The battery is configured to supply a current to, at least, the piezoelectric fiber sensor and the flex sensors. The microprocessor is configured to store in the memory, at least, the voltage output readings of the piezoelectric fiber sensor and the flex sensors.

Embodiments of the present invention provide a smart cable deformation monitoring system. A non-limiting example of the deformation monitoring system includes a smart electronic cable and a remote monitoring device. The electronic cable includes a centrally located piezoelectric fiber sensor, two or more flex sensors, a battery, a memory, and a microprocessor. The piezoelectric fiber sensor has a length that longitudinally extends along at least a portion of the electronic cable in an axial direction. The piezoelectric fiber sensor is configured to produce voltage readings that are proportional to tensile loads experienced by the electronic cable in the axial direction over time. The flex sensors are arranged radially external to the piezoelectric fiber sensor. Each flex sensor has a length that longitudinally extends along, at least, a portion of the electronic cable in the axial direction. The flex sensors are configured to output voltage readings that are proportional to lateral loads experienced by the electronic cable in a radial direction over time. The battery is configured to supply a current to, at least, the piezoelectric fiber sensor and the flex sensors. The microprocessor is configured to store in the memory, at least, the voltage output readings of the piezoelectric fiber sensor and the flex sensors. The remote monitoring device is electronically coupled to the microprocessor. The remote monitoring device is configured to receive the stored voltage output readings of the piezoelectric fiber sensor and the flex sensors. The remote monitoring device is further configured to monitor strain of the electronic cable based on the received voltage readings.

Embodiments of the present invention provide a computer-implemented method for monitoring deformation of a smart electronic cable. A non-limiting example of the method includes transmitting, by a remote monitoring device, a request to a microprocessor of an electronic cable, in which the electronic cable includes a centrally located piezoelectric fiber sensor, two or more flex sensors, a battery, a memory, and a microprocessor. The piezoelectric fiber sensor has a length that longitudinally extends along, at least, a portion of the electronic cable in an axial direction. The piezoelectric fiber sensor is configured to produce voltage readings that are proportional to tensile loads experienced by the electronic cable in the axial direction over time. The flex sensors are arranged radially external to the piezoelectric fiber sensor. Each flex sensor has a length that longitudinally extends along, at least, a portion of the electronic cable in the axial direction. The flex sensors are configured to output voltage readings that are proportional to lateral loads experienced by the electronic cable in a radial direction over time. The battery is configured to supply a current to, at least, the piezoelectric fiber sensor and the flex sensors. The microprocessor is configured to store in the memory, at least, the voltage output readings of the piezoelectric fiber sensor and the flex sensors. The method further includes receiving, by the remote monitoring device, in response to the request, the stored voltage output readings of the piezoelectric fiber sensor and the flex sensors. The method further includes monitoring strain of the electronic cable based on the received voltage readings.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

example cable deformation monitoring system 800 in accordance with one or more embodiment of the present invention

Figure 1:
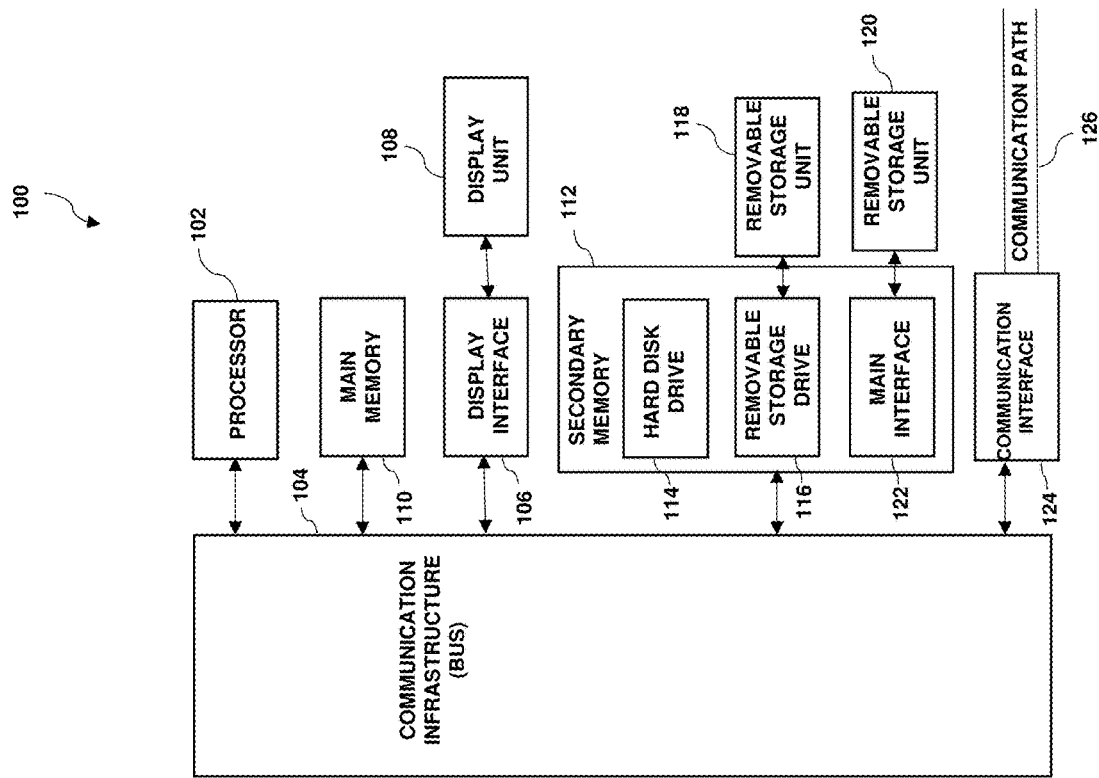
FIG. 1 depicts an exemplary computer system capable of implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains," or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as noted above, many modern server environments utilize dense configurations of sensitive cables to meet aggressive speed and reliability requirements. These cables have a minimum bend radius below which performance and service life decrease. However, present cables and systems are not able to measure, quantify, and store mechanical strain induced on a cable throughout the cables service life, much less do so locally on the cable without needing the cable to be plugged in and/or externally powered.

Some technologies utilize sensors to measure strains on cables, however, technical problems arise in those systems. For example, one problem found in prior systems is that electronic cables are not able to record voltage readings from internal sensors during a time where the cable is not in operation as those cables do not include an internal power source and a memory to store voltage values. For example, if one were to ship such a cable from a first location to a second location, a user at the second location would not be able to determine whether the cable was excessively bent during shipping.

Turning now to an overview of the aspects of the invention, one or more embodiments of the invention address the above-described shortcomings of the prior art by providing a smart electronic cable that is able to measure, record, and/or transmit data associated with mechanical strains that are applied to the electronic cable without the need of an external power source. For example, in some embodiments of the present invention, the electronic cable includes a system having a plurality of flex sensors, a piezoelectric fiber sensor, a battery, and a microprocessor, in which the battery powers the sensors and the microprocessor obtains and records time varying voltage values from the sensors. In some embodiments of the present invention, the electronic cable further includes an illumination device that acts as a light indicator to signal the health of the cable based on the strain data and function limits that are set for the cable. In some embodiments of the present invention, the electronic cable communicates with a remote monitoring device, in which the remote monitoring device measures and/or monitors strain values based on the recorded voltage values. Thus the health of the electronic cable can be ascertained without the need of an external power source.

Turning now to a more detailed description of aspects of the present invention, FIG. 1 illustrates a high level block diagram showing an example of a computer-based system 100 useful for implementing one or more embodiments of the invention. Although one exemplary computer system 100 is shown, computer system 100 includes a communication path 126, which connects computer system 100 to additional systems and may include one or more wide area networks (WANs) and/or local area networks (LANs) such as the internet, intranet(s), and/or wireless communication network(s). Computer system 100 and additional systems are in communication via communication path 126, (e.g., to communicate data between them).

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by a removable storage drive 116. As will be appreciated, removable storage unit 118 includes a computer readable medium having stored therein computer software and/or data.

In some alternative embodiments of the invention, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etc. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, a RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110, and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

Figure 2:
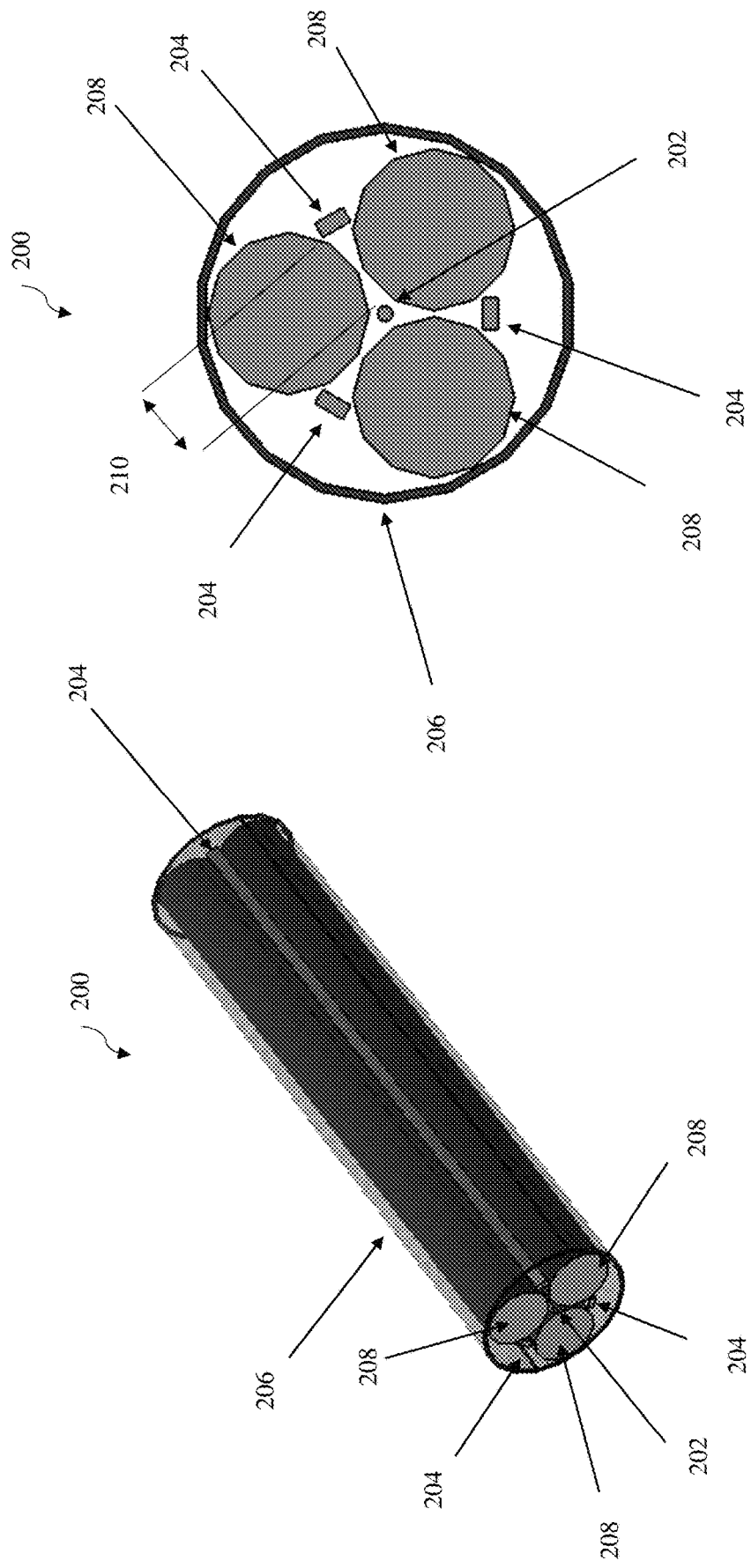
FIG. 2A depicts a perspective view of an example electronic cable in accordance with one or more embodiments of the present invention.
FIG. 2B depicts a front view of the electronic cable of FIG. 2A in accordance with one or more embodiments of the present invention.

FIG. 2A-B depict an example electronic cable 200 in accordance with one or more embodiments of the present disclosure, in which FIG. 2A depicts a perspective view of electrical cable 200 and FIG. 2B depicts a cross sectional view of electronic cable 200. Electronic cable 200 includes a piezoelectric fiber sensor 202, two or more flex sensors 204, a cable jacket 206, and two or more electrical wires 208. In some embodiments of the present invention, the cable jacket 206 includes an inner surface and an outer surface, in which the inner surface defines a lumen within which the piezoelectric fiber sensor 202 and the electrical wires 208 are located. Example suitable electrical wires 208 include, but are not limited to, copper electrical wires. In some embodiments of the present invention, the electrical wires 208 comprise electrical and/or optical conductors for carrying electrical power and/or signal. For example, in some embodiments of the present invention, electrical wires 208 include copper. In some embodiments of the present invention, each electrical wire of the two or more electrical wires 208 represents an individual bundle of conductive wires.

The piezoelectric fiber sensor 202 is centrally located within the body of the electronic cable 200 and has a length that extends longitudinally along the electronic cable in an axial direction. The piezoelectric fiber sensor 202 is configured to produce voltage readings that are proportional to the tensile loads experienced by the electronic cable in the axial direction over time. For example, a piezoelectric fiber sensor 202 is configured to output voltage readings proportional to the amount of axial strain that is sensed when the electrical cable 200 is stretched or compressed in the axial direction.

The flex sensors 204 are configured to output voltage readings proportional to the lateral loads that are experienced by the electronic cable in a radial direction over time (e.g., bending strains). In some embodiments of the present invention, each flex sensors 204 is a resistor strip having a variable resistance, in which the resistance strip is capable of producing a change in voltage in response to a change in the resistance of the resistor strip. In some embodiments of the present invention, the flex sensors 204 are arranged radially external to the piezoelectric fiber sensor 202 such that the piezoelectric fiber sensor 202 is centrally located with respect to the flex sensors. For example, in some embodiments of the present invention, the flex sensors are positioned a distance 210 away from the piezoelectric fiber sensor 202. Each flex sensor 204 has a length that longitudinally extends along the electronic cable 200 in the axial direction.

In some embodiments of the present invention, the flex sensors 204 are spaced 120 degrees apart about a central longitudinal axis of the electronic cable 200. By spanning the flex sensors 204 at 120 degrees, full coverage for monitoring the axial strains can be achieved while minimizing the number of flex sensors 204 that are needed.

Figure 3:
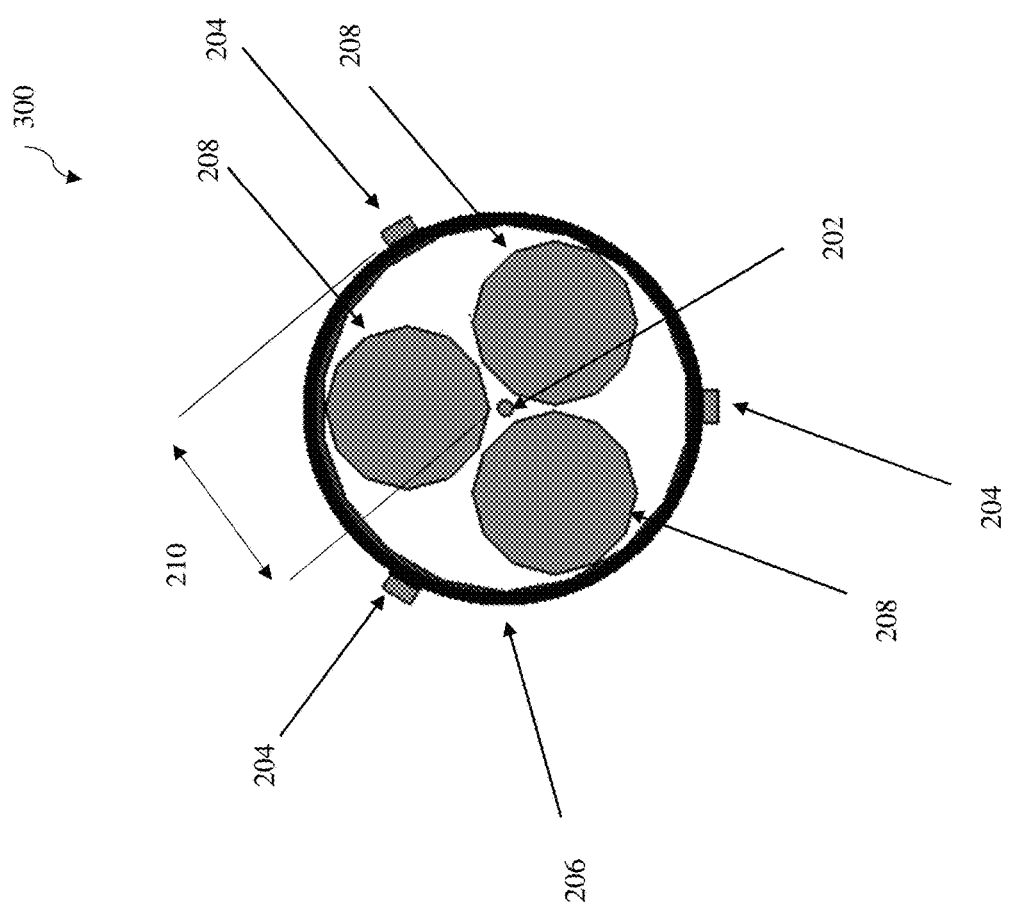
FIG. 3 depicts a front view of another example electronic cable in accordance with one or more embodiments of the present invention.

FIG. 3 depicts a cross sectional view of another example electronic cable 300 in accordance with one or more embodiments of the present invention. Same numbers are used to identify like components having the same or similar functions to the elements of FIGS. 2A and 2B. Electronic cable 300 includes three flex sensors 204 that are attached to the outer surface of the cable jacket 206. In some embodiments of the present invention, the flex sensors 204 are embedded within the cable jacket 206 (e.g., between the inner surface and outer surface).

Figure 4:
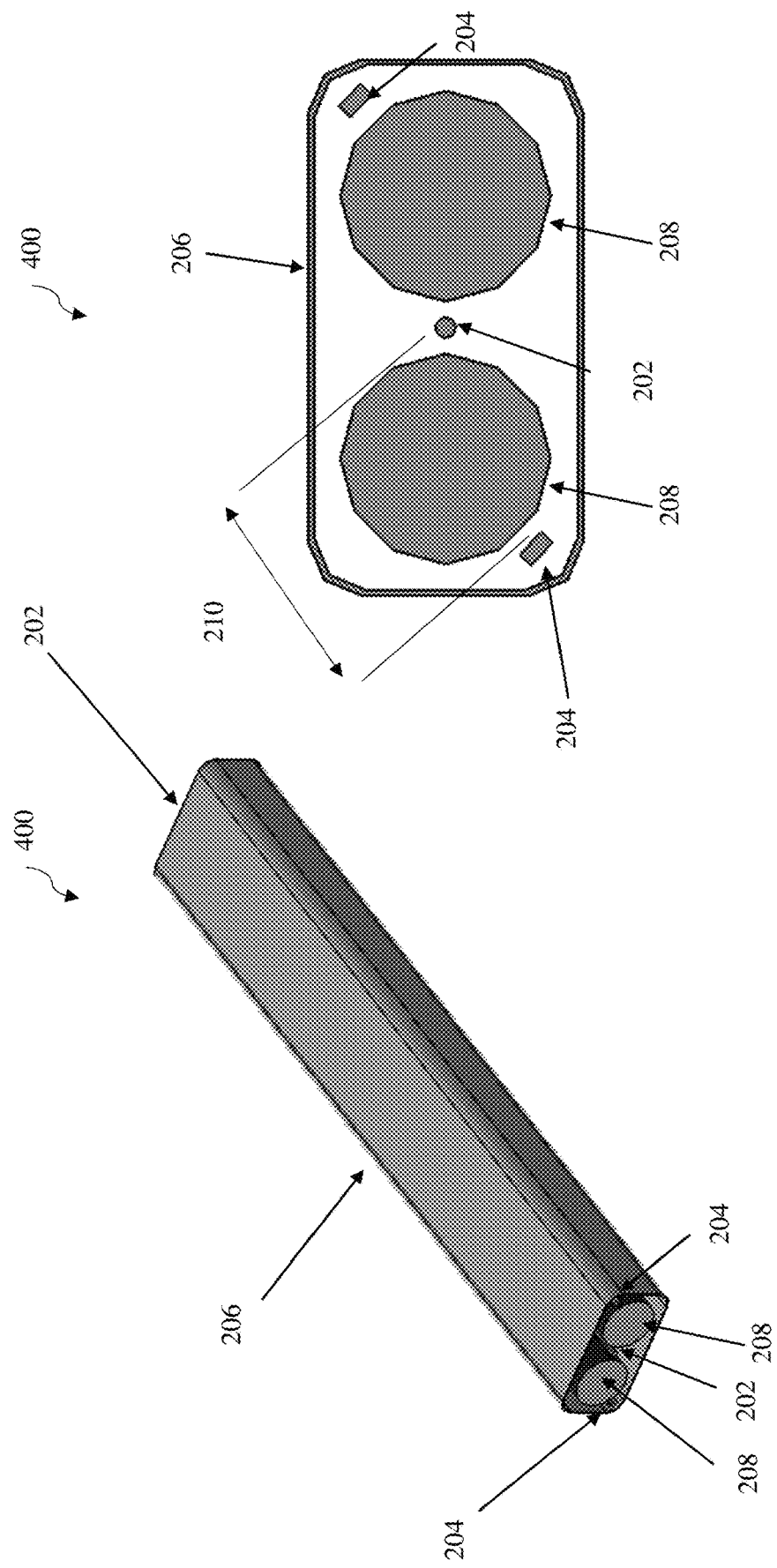
FIG. 4A depicts a perspective view of another example electronic cable in accordance with one or more embodiments of the present invention.
FIG. 4B depicts a front view of the electronic cable of FIG. 4A in accordance with one or more embodiments of the present invention.
Figure 5:
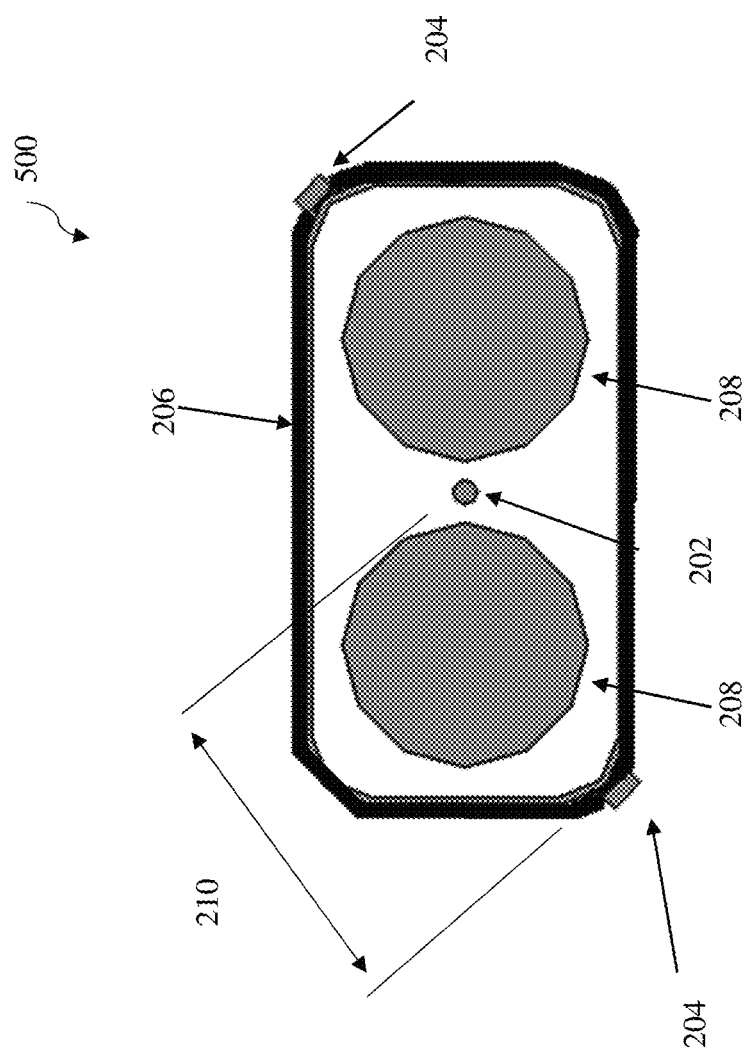
FIG. 5 depicts a front view of another example electronic cable in accordance with one or more embodiments of the present invention.

Various geometries of electronical cables and numbers of flex sensors 204 and piezoelectric fiber sensor(s) 202 may be utilized in accordance with one or more embodiments of the present invention. FIGS. 2A, 2B, and 3 illustrate examples of round electronic cables 200 and 300 in accordance with one or more embodiments of the present invention (e.g., has a circular cross sectional geometry, oval cross sectional geometry, etc.). Same numbers are used to identify like components having the same or similar functions to the elements. FIGS. 4A, 4B, and 5 illustrate examples of flat electronic cables 400 and 500 in accordance with one or more embodiments of the present invention (e.g., has a rectangular cross sectional geometry, square cross sectional geometry, prism cross sectional geometry, rhombus cross sectional geometry etc.).

In some embodiments of the present invention, the at least two flex sensors 204 are exactly two flex sensors, exactly three flex sensors, or three or more flex sensors. For example, in some embodiments of the present invention, the electronic cable includes only three flex sensors 204 and a single piezoelectric fiber sensor 202 (e.g., FIGS. 2A, 2B, 3, and 7). In some embodiments of the present invention, the electronic cable includes only two flex sensors 204 and a single piezoelectric fiber sensor 202 (e.g., FIGS. 4A, 4B, 5, 6A, 6B, and 6C).

In some embodiments of the present invention, round electronic cables, such as electronic cables 200 and 300 of FIGS. 2A, 2B, 3, and 7 include a piezoelectric fiber sensor 202 and no less than three flex sensors 204. For example, in some embodiments of the present invention, only three flex sensors 204 and a single piezoelectric fiber sensor 202 are used in round cables irrespective of the number of electrical wires 208 that are included in the electronic cable. In some embodiments of the present invention, round electronic cables include at least three flex sensors 204 and a single piezoelectric fiber sensor 202 irrespective of the number of electrical wires 208 that are included in the electronic cable. In some embodiments of the present invention, round electronic cables include a flex sensor 204 for each wire 208 that is included in the cable.

In some embodiments of the present invention, flat electronic cables, such as flat electronic cables 400 and 500 of FIGS. 4A, 4B, 5, 6A, 6B, and 6C, include a piezoelectric fiber sensor 202 and no less than two flex sensors 204. For example, in some embodiments of the present invention, only two flex sensors 204 and a single piezoelectric fiber sensor 202 are used in flat cables irrespective of the number of electrical wires 208 that are included in the electronic cable. In some embodiments of the present invention, only four flex sensors 204 and a single piezoelectric fiber sensor 202 are used in flat cables irrespective of the number of electrical wires 208 that are included in the electronic cable (e.g., a flex sensor for each corner of the cross sectional geometry of the flat electronic cable). In some embodiments of the present invention, flat electronic cables include at least two flex sensors 204 and a single piezoelectric fiber sensor 202 irrespective of the number of electrical wires 208 that are included in the electronic cable.

In some embodiments of the present invention, the flex sensors 204 and electrical wires 208 are located within the lumen defined by the inner surface of the cable jacket 206 of the electronic cable, such as in the electronic cable 200 and 400. In some embodiments of the present invention, electrical wires 208 are located within the lumen defined by the inner surface of the cable jacket 206 of the electronic cable, but the flex sensors 204 are attached to the outer surface of the cable jacket 206, such as in the electronic cable 300 and 500. In some embodiments of the present invention, the flex sensors 204 are embedded within the cable jacket 206, such as between the inner surface and outer surface of the cable jacket 206.

It should be understood that other suitable number of flex sensors 204 and piezoelectric fiber sensor(s) 202 may be utilized in one or more embodiments of the present invention. In some embodiments of the present invention, piezoelectric fiber sensor 202 may comprise a plurality of piezoelectric fiber sensors.

In FIGS. 2A-B, the piezoelectric fiber sensor 202 and the flex sensors 204 are shown as spanning the entire length of electronic cable 200, however, it should be understood that in some embodiments of the present invention, the piezoelectric fiber sensor 202 and/or the flex sensors 204 of an electronic cable may span only a portion of the length of the electronic cable and/or are located at multiple different positions along the length of the electric cable. For example, in some embodiments of the present invention, the electronic cable includes a plurality of segments, in which only a subset of segments include a piezoelectric fiber sensor 202 and flex sensors 204. In some embodiments of the present invention, a combination of a piezoelectric fiber sensor 202 and multiple flex sensors 204 are located at multiple different positions along the length of the electric cable such that each segment of the electric cable is associated with a respective combination of sensors.

Figure 6A:
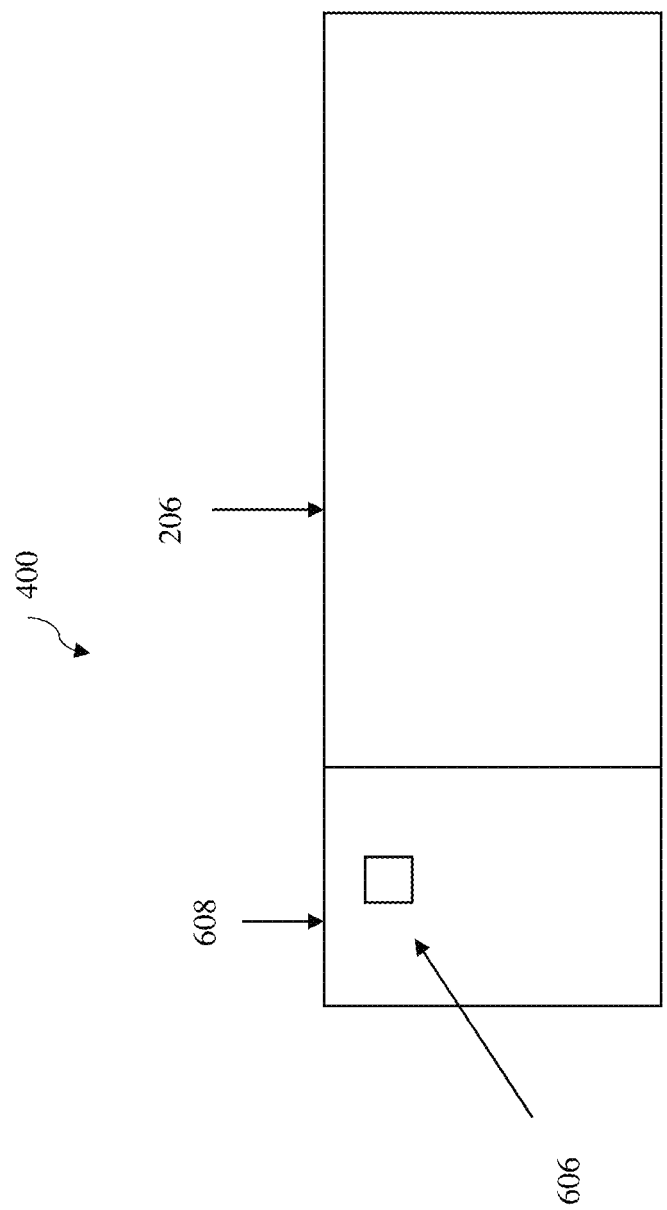
FIG. 6A depicts an outside side view of the electronic cable of FIGS. 4A and 4B in accordance with one or more embodiments of the present invention.
Figure 6B:
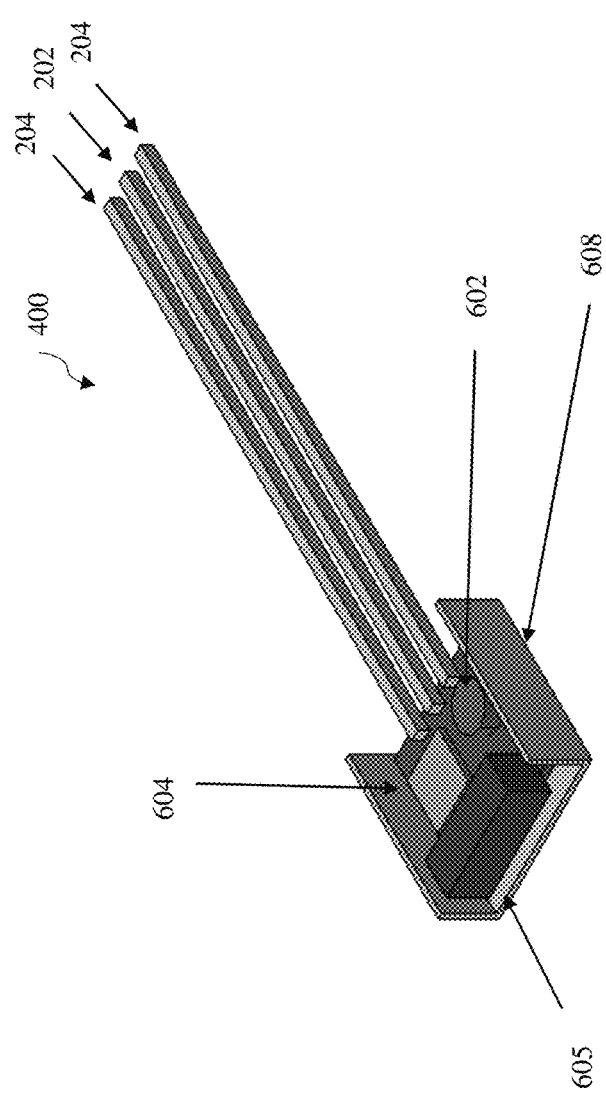
FIG. 6B depicts a cutaway perspective view of the electronic cable of FIGS. 4A and 4B in accordance with one or more embodiments of the present invention.
Figure 6C:
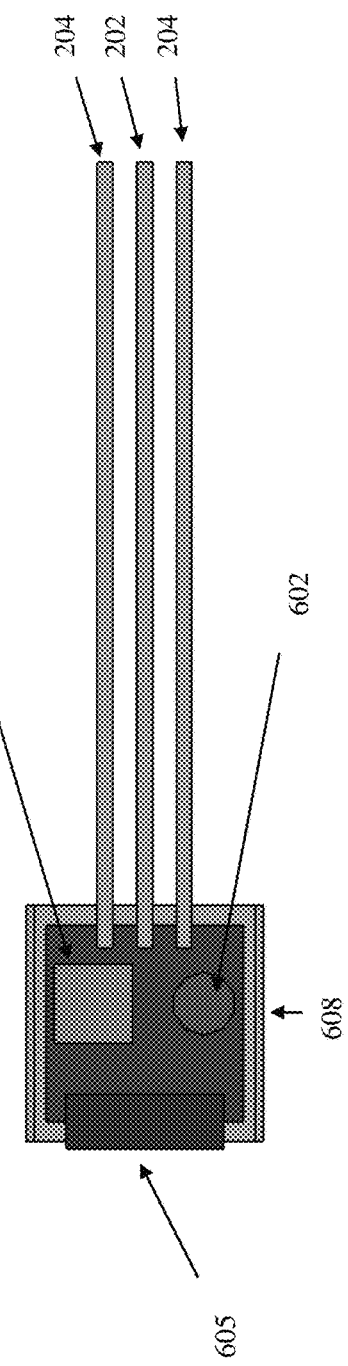
FIG. 6C depicts a cutaway side view of the electronic cable FIGS. 4A and 4B in accordance with one or more embodiments of the present invention.

In some embodiments of the present invention, electronic cables 200-500 further includes a battery, a memory, a microprocessor, and an illumination device. FIGS. 6A-6C, illustrate an example embodiment in which electronic cable 400 further includes a battery 602, a microprocessor 604 with a memory, and an illumination device 606. In this example the battery 602, the microprocessor 604 with the memory, and the illumination device 606 are each housed in a cable connector 608 of electronic cable 400, in which cable connector 608 includes an output connector 605 that is configured to connect wires of electric cable 400 to an outside source (e.g., a second cable, a switch, a router, an end-point device, etc.). In particular, FIG. 6A depicts an outside side view of electronic cable 400, FIG. 6B depicts a cutaway perspective view of electronic cable 400, and FIG.

6C depicts a cutaway side view of electronic cable 400 in accordance with one or more embodiments of the present invention.

The cable connector 608 of electronic cable 400 is a connector that is coupled to the piezoelectric fiber sensor 202 and the flex sensors 204. For example, in some embodiments of the present invention, connector 608 is coupled to an end of the cable jacket 206 in the axial direction. In some embodiments of the present invention, electronic cable 400 includes one or more cable connectors 608 that are positioned adjacent to the cable jacket 206. For example, in some embodiments of the present invention, one or more cable connectors 608 are coupled to one or more ends of the cable jacket 206 in the axial direction.

In some embodiments of the present invention, electronic cable 400 does not include a cable connector 608 for housing the battery 602, the microprocessor 604 with the memory, and the illumination device 606. For example, in some embodiments of the present invention, electronic cable 400 houses the battery 602, the microprocessor 604 with the memory, and/or the illumination device 606 within the lumen of the cable jacket 206. For example, in some embodiments of the present invention, the battery 602, the microprocessor 604 with the memory, and/or the illumination device 606 are attached to or embedded within the body of the cable jacket 206 itself. In some embodiments of the present invention, the microprocessor 604 with the memory are a unitary device. In some embodiments of the present invention, the microprocessor 604 with the memory are a combination of two or more devices. For example, in some embodiments of the present invention, the memory may be external to the microprocessor 604.

Referring back to FIGS. 6A-C, the battery 602 of electronic cable 400 is configured to supply a current to the piezoelectric fiber sensor and the at least two flex sensors, such that voltage readings pertaining to the axial and bending strains that are experienced by the electronic cable, over a period of time, are obtained. The microprocessor 604 is configured to store in the memory the voltage output readings of the piezoelectric fiber sensor and the flex sensors. In some embodiments of the present invention, the voltage readings stored by the microprocessor 604 include a maximum voltage, a minimum voltage, and/or transient voltage values that are obtained by the sensors.

In some embodiments of the present invention, the microprocessor 604 is further configured to measure tensile and compression strain values of the electronic cable based on the output voltage readings of the piezoelectric fiber sensor, and to measure bending strain values of the electronic cable based on the output voltage readings of the flex sensors. In some embodiments of the present invention, the measured bending strain values and the tensile and compression strain values are then stored in memory by the microprocessor 604.

The illumination device 606 is a light emitting device that is capable of providing a visual indication of the health of the electronic cable 400. For example, in some embodiments of the present invention, the illumination device 606 is configured to display one or more colors in response to receiving one or more signals from the microprocessor 604, in which the one or more colors are indicative of the health of electronic cable 400, as determined by the microprocessor 604, when monitoring the strain values and/or voltages that are obtained. In some embodiments of the present invention, the illumination device 606 includes one or more light emitting diodes that are each capable of displaying a respective color. It should be understood that various suitable types of displays and/or color light emitting devices may be utilized in one or more embodiments of the present invention, such as for example, LEDs.

In some embodiments of the present invention, the microprocessor 604 is configured to determine whether at least one output voltage reading of the output voltage readings of the flex sensors 204 exceeds a first predetermined maximum voltage, and to cause the illumination device 606 to display a color upon the microprocessor determining that the least one output voltage reading of the output voltage readings of the at least two flex sensors 204 exceeds the first predetermined maximum voltage. For example, in some embodiments of the present invention, if an output voltage reading of the at least two flex sensors 204 indicates that the health of the electronic cable is degraded (e.g., the output voltage readings of the flex sensors 204 exceeds the first predetermined maximum voltage), then a color is caused to be displayed that is associated with such an event (e.g., the color red). In some embodiments of the present invention, if an output voltage reading of the at least two flex sensors 204 indicates that the health of the electronic cable is in good working condition (e.g., the output voltage readings of the flex sensors 204 do not exceed the first predetermined maximum voltage), then a color is caused to be displayed that is associated with such an event (e.g., the color green). In some embodiments of the present invention, the output voltage readings of the at least two flex sensors 204 are time varying voltages values (e.g., maximum, minimum, transient, etc.) that are calculated, recorded, and monitored over a period a time (e.g., minutes, days, weeks, months, years etc.).

Several technical benefits stem from the inclusion of a battery, a memory, a microprocessor, and an illumination device in an electronic cable in accordance with one or more embodiments of the present invention. For example, mechanical strains that are experienced by the electronic cable can be measured and recorded even when an external power source is not available such as when an electronic cable is being shipped from one destination to another. A user who receives the shipped electronic cable would be able to ascertain from the electric cable itself whether the electronic cable was damaged during shipping and thus may decide against the installation of the cable at the final destination.

Figure 7:
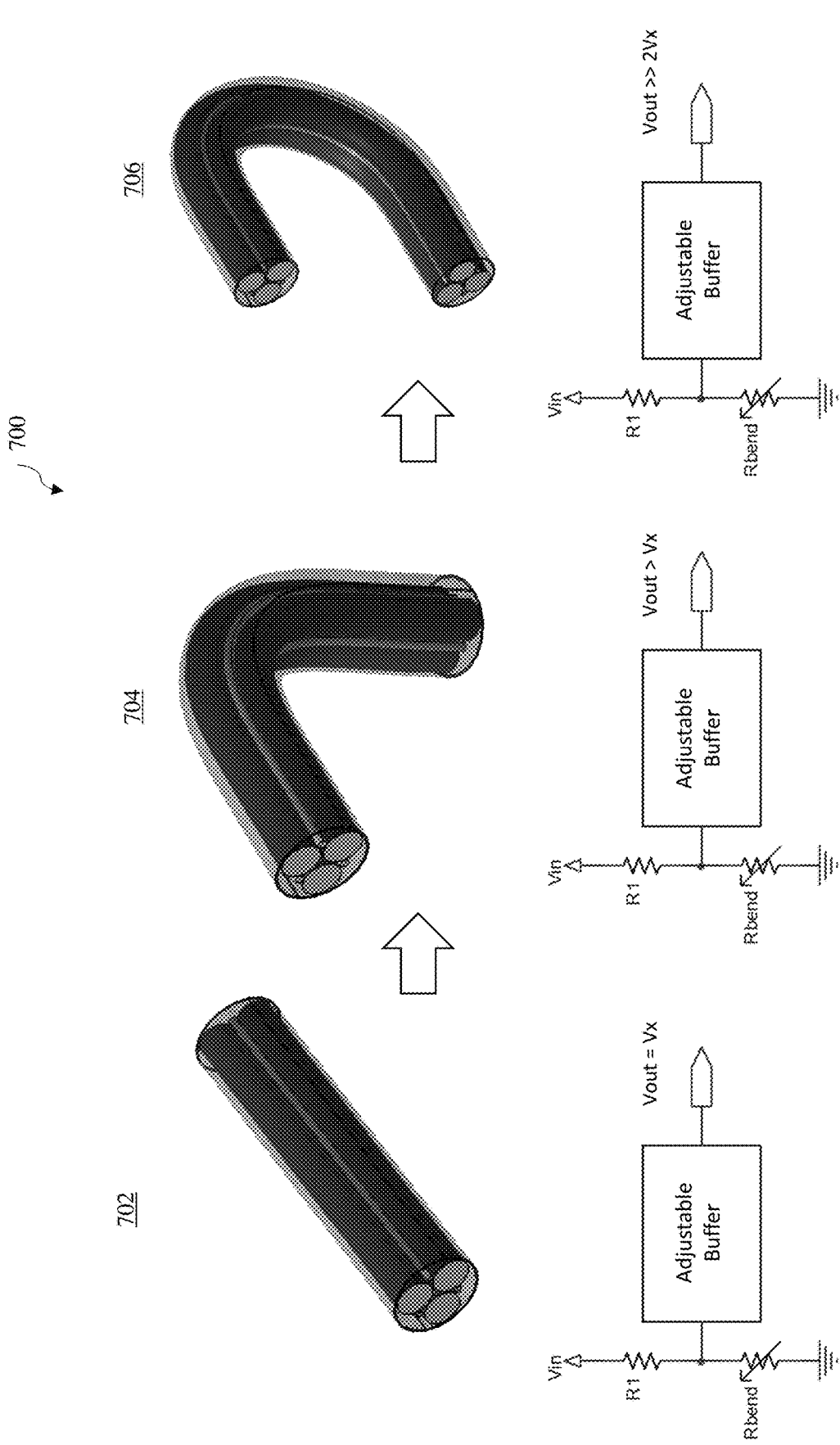
FIG. 7 depicts a flow diagram showing an example electronic cable and associated circuit diagram in accordance with one or more embodiments of the present invention.

FIG. 7 depicts an example flow diagram 700 showing an electronic cable (e.g., electronic cable 200) and associated circuit diagram in accordance with one or more embodiments of the present invention. In particular, flow 700 shows various points in time when flex sensor voltage is measured for a particular bending radius and a determination is made as to whether an output voltage exceeds a predetermined first predetermined maximum voltage (e.g., $V_{out}=V_x$, $V_{out}>>2V_x$). In some embodiments of the present invention, the first predetermined maximum voltage is a voltage that is associated with a predetermined minimum bending radius of the electronic cable. The minimum bending radius is the radius at which performance and service life of the electronic cable would decrease when the bending radius is below the minimum bending radius.

In some embodiments of the present invention, each type of electronic cable is calibrated (e.g., round cables, flat cables, etc.) to identify the output voltage of the flex sensors when the electronic cable is in a default and/or relaxed state (e.g., $V_{out}=V_x$), such as when the electronic cable is substantially straight (e.g., FIG. 7, at 702). In some embodiments of the present invention, the first predetermined maximum voltage is equal to the output voltage measured when the electronic cable is in a default and/or related state (e.g., $V_x$). In some embodiments of the present invention, the first predetermined maximum voltage is a multiple of a voltage that is measured by the flex sensors when the electronic cable is in a relaxed and/or default state, for example, double or other suitable multiples (e.g., $2V_x$).

In some embodiments of the present invention, the minimum bending radius is associated with a 90 degree bend in the electronic cable (e.g., FIG. 7, at 704), which causes the output voltage of the flex sensors to exceed the output voltage that was measured when in the relaxed and/or default state (e.g., $V_{out}>V_x$). In some embodiments of the present invention, the minimum bending radius is associated with a 180 degree bend in the electronic cable (e.g., FIG. 7, at 706), which causes the output voltage of the flex sensors to exceed the output voltage that was measured when in the relaxed and/or default state by a multiple (e.g., $V_{out}>V_x$, $V_{out}>>2V_x$).

Referring back to FIGS. 6A-C, in some embodiments of the present invention, the microprocessor 604 is configured to determine whether at least one output voltage reading of the output voltage readings of the piezoelectric fiber sensor 202 exceeds a second predetermined maximum voltage, in which the second predetermined maximum voltage is associated with a predetermined maximum axial strain of the electronic cable. In some embodiments of the present invention, upon the microprocessor 604 determining that the at least one output voltage reading of the output voltage readings of the piezoelectric fiber sensor 202 exceeds the second predetermined maximum voltage, the microprocessor 604 then causes the illumination device 606 to display a color. For example, if an output voltage reading of the at the piezoelectric fiber sensor 202 indicates that the health of the electronic cable is degraded (e.g., determining that the at least one output voltage reading of the output voltage readings of the piezoelectric fiber sensor 202 exceeds the second predetermined maximum voltage), then a color is caused to be displayed that is associated with such an event (e.g., the color red). In some embodiments of the present invention, if an output voltage reading of the at the piezoelectric fiber sensor 202 indicates that the health of the electronic cable is in good working condition (e.g., determining that the at least one output voltage reading of the output voltage readings of the piezoelectric fiber sensor 202 does not exceed the second predetermined maximum voltage), then a color is caused to be displayed that is associated with such an event (e.g., the color green). In some embodiments of the present invention, the output voltage readings of the piezoelectric fiber sensor 202 are time varying voltages values (e.g., maximum, minimum, transient, etc.) that are calculated, recorded, and monitored over a period a time (e.g., minutes, days, weeks, months, years etc.).

In some embodiments of the present invention, the microprocessor 604 is configured to cause the illumination device 606 to display a color upon the microprocessor 604 determining that both (a) the at least one output voltage reading of the output voltage readings of the at least two flex sensors 204 exceeds the first predetermined maximum voltage and (b) the at least one output voltage reading of the output voltage readings of the piezoelectric fiber sensor 202 exceeds the second predetermined maximum voltage. For example, if both of the voltage readings indicate that the health of the electronic cable is degraded (e.g., both (a) and (b) occurring), then a color is caused to be displayed that is associated with such an event (e.g., the color red). In some embodiments of the present invention, if either of the voltage readings indicate that the health of the electronic cable is degraded (e.g., either (a) or (b) occurring), then a color is caused to be displayed that is associated with such an event (e.g., the color red). In some embodiments of the present invention, if both the voltage readings indicate that the health of the electronic cable is in good working condition (e.g., both (a) and (b) occurring), then a color is caused to be displayed that is associated with such an event (e.g., the color green).

In some embodiments of the present invention, no color is caused to be displayed when either or both of the voltage readings indicate that the health of the electronic cable is determined to be degraded. For example, in some embodiments of the present invention, the illumination device 606 is caused to emit a light only when the electronic cable is determined to be in good working condition. Thus the illumination device 606 would provide a visual indication indicative that the electronic cable is in good working condition.

In some embodiments of the present invention, no color is displayed when either or both of the voltage readings indicate that the health of the electronic cable is in good working condition. For example, in some embodiments of the present invention, the illumination device 606 is caused to emit a light only when the electronic cable is determined to be degraded.

Figure 8:
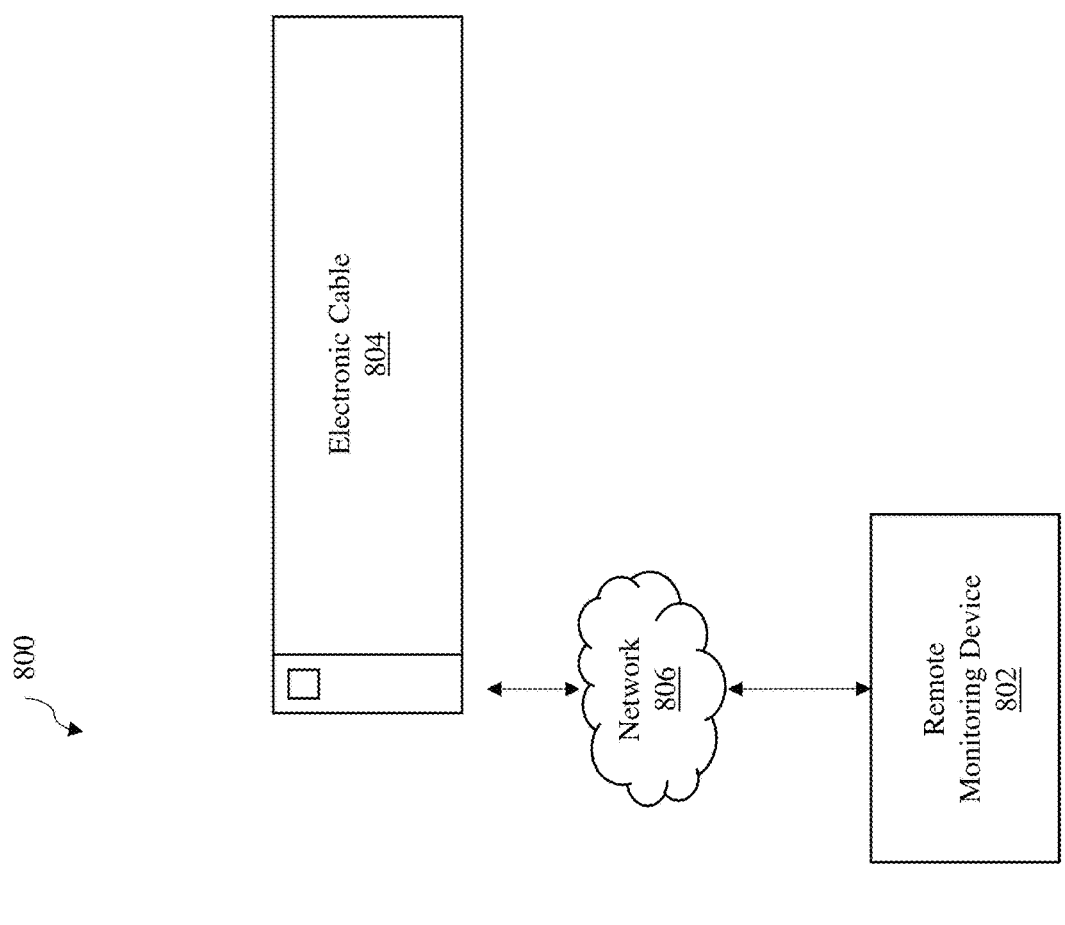
FIG. 8 depicts a block diagram of an example system in accordance with one or more embodiments of the present invention.

FIG. 8 depicts an example cable deformation monitoring system 800 in accordance with one or more embodiment of the present invention. Deformation monitoring system 800 includes a remote monitoring device 802 and an electronic cable 804. In FIG. 8, an external side view of the electronic cable 804 is shown and thus the internal components of electronic cable 804 are not depicted in the figure. It should be understood that electronic cable 804 may include components similar to the components of electric cables 200, 300, 400, or 500. For example, in some embodiments of the present invention, electronic cable 804 includes a piezoelectric fiber sensor, two or more flex sensors, a cable jacket, two or more electrical wires, a battery, a microprocessor, and a memory. In some embodiments of the present invention, the microprocessor of electronic cable 804 is electronically coupled to the remote monitoring device 802 via a wireless connection, such as over a wireless network 806. In some embodiments of the present invention, the microprocessor of the electronic cable 804 is electronically coupled to the remote monitoring device 802 via a wired connection. In some embodiments of the present invention, the wireless and/or wired connection is established via one or more communication interfaces, such as via a wireless and/or wired communication interface that is housed in electronic cable 804 (e.g., via Ethernet, WIFI, Bluetooth technology, near field communication technology, etc.)

The remote monitoring device 802 is configured to receive the stored voltage output readings of the piezoelectric fiber sensor and the flex sensors and to monitor strain of the electronic cable 804. For example, in some embodiments of the present invention, remote monitoring device 802 is configured to measure tensile and compression strain values for the electronic cable 804 based on the output voltage readings of the piezoelectric fiber sensor, and/or measure bending strain values for the electronic cable 804 based on the output voltage readings of the flex sensors. In some embodiments of the present invention, the remote monitoring device 802 is further configured to store the measured bending, tensile, and/or compression strain values in a database comprising cable health data. In some embodiments of the present invention, the cable health data of the database is indexed using a plurality of cable identifiers, in which each electric cable in the database is associated with a unique cable identifier. In some embodiments of the present invention, the remote monitoring device 802 is configured to receive a cable identifier from the electric cable 804, and to search the database using the received cable identifier to identify cable health data that is associated with the electric cable 804.

In some embodiments of the present invention, the remote monitoring device 802 is configured to monitor strains of the electronic cable 804 by determining whether at least one output voltage reading of the output voltage readings of the at least two flex sensors exceeds a first predetermined maximum voltage, determining whether the at least one output voltage reading of the output voltage readings of the piezoelectric fiber sensor exceeds a second predetermined maximum voltage, and then upon determining that (a) the at least one output voltage reading of the output voltage readings of the at least two flex sensors exceeds the first predetermined maximum voltage or (b) the least one output voltage reading of the output voltage readings of the piezoelectric fiber sensor exceeds the second predetermined maximum voltage, transmitting a signal to the microprocessor to the cause the illumination device to display a color.

Alternatively, in some embodiments of the present invention, the microprocessor of electronic cable 804 is configured to measure the tensile, compression, and/or bending strain values instead of the remote monitoring device 802 measuring said values. In some embodiments of the present invention, remote monitoring device 802 is configured to receive the bending, tensile, and/or compression strain values that are measured by the microprocessor of electronic cable 804, and to transmit a signal to the microprocessor to cause the illumination device to display a color under certain conditions such as the conditions mentioned above.

Figure 9:
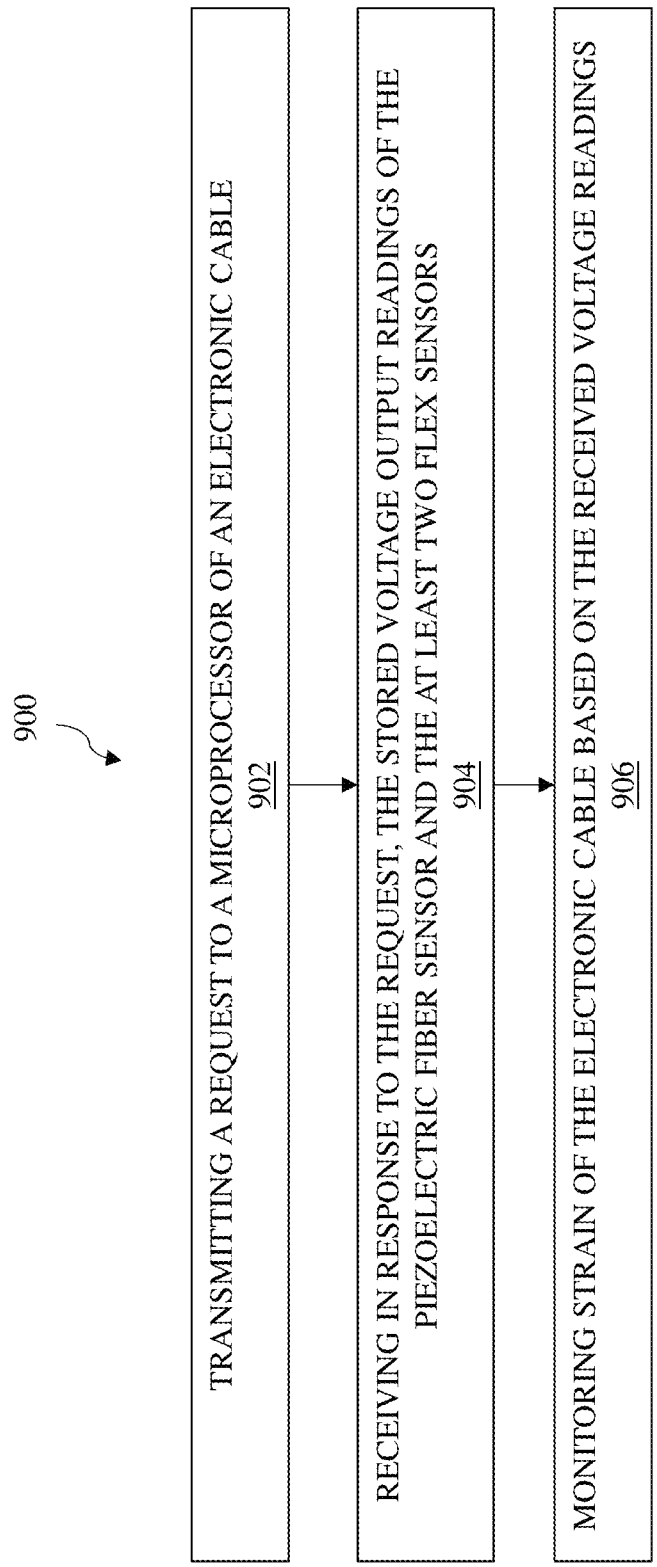
FIG. 9 is a flow diagram illustrating a methodology in accordance with one or more embodiments of the present invention.

Additional details of the operation of system 800 will now be described with reference to FIG. 9, in which FIG. 9 depicts a flow diagram illustrating a methodology 900 according to one or more embodiments of the present invention. At 902, a request is transmitted by a remote monitoring device (e.g., remote monitoring device 802) to an electronic cable (e.g., electronic cable 804) to obtain associated strain data associated such as sensed voltages that are stored in memory of the electronic cable. At 904, the stored voltage output readings of the piezoelectric fiber sensor and the flex sensors are received by the remote monitoring from the memory of the electronic cable. At 906, strains of the electric cable are monitored based on the received voltage readings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An electronic cable comprising:
    a centrally located piezoelectric fiber sensor having a length longitudinally extending along at least a portion of electronic cable in an axial direction, the piezoelectric fiber sensor is configured to produce voltage readings that are proportional to tensile loads experienced by the electronic cable in the axial direction over time;
    at least two flex sensors arranged radially external to the piezoelectric fiber sensor, each flex sensor having a length longitudinally extending along at least a portion of electronic cable in the axial direction, wherein the at least two flex sensors are configured to output voltage readings that are proportional to lateral loads experienced by the electronic cable in a radial direction over time;
    a battery configured to supply a current to at least the piezoelectric fiber sensor and the at least two flex sensors;
    a memory; and
    a microprocessor configured to store in the memory the voltage output readings of the piezoelectric fiber sensor and the at least two flex sensors.

2. The electronic cable of claim 1, wherein the microprocessor is further configured to:
    measure tensile and compression strain values of the electronic cable based on the output voltage readings of the piezoelectric fiber sensor;
    measure bending strain values of the electronic cable based on the output voltage readings of the at least two flex sensors;
    store the measured tensile, compression, and bending strain values in the memory.

3. The electronic cable of claim 2 further comprising:
    an illumination device;
    wherein the microprocessor is further configured to:
        determine whether at least one output voltage reading of the output voltage readings of the at least two flex sensors exceeds a first predetermined maximum voltage, wherein the first predetermined maximum voltage is associated with a predetermined minimum bending radius of the electronic cable;
        determine whether at least one output voltage reading of the output voltage readings of the piezoelectric fiber sensor exceeds a second predetermined maximum voltage, wherein the second predetermined maximum voltage is associated with a predetermined maximum axial strain of the electronic cable;
    wherein the illumination device is configured to display a color upon the microprocessor determining that the at least one output voltage reading of the output voltage readings of the at least two flex sensors exceeds the first predetermined maximum voltage or that the at least one output voltage reading, of the output voltage readings of the piezoelectric fiber sensor exceeds the second predetermined maximum voltage.

4. The electronic cable of claim 1, wherein the electronic cable has a rectangular cross-sectional geometry, wherein the electronic cable further includes two or more electrical wires located within a lumen defined by an inner surface of a cable jacket of the electronic cable, wherein the at least two flex sensors comprise two flex sensors located within the lumen.

5. The electronic cable of claim 1, wherein the electronic cable has a rectangular cross-sectional geometry, wherein the electronic cable further includes two or more electrical wires located within a lumen defined by an inner surface of a cable jacket of the electronic cable, wherein the at least two flex sensors comprise two flex sensors that are embedded within the cable jacket or attached to an outer surface of the cable jacket.

6. The electronic cable of claim 1, wherein the electronic cable has a circular cross-sectional geometry, wherein the at least two flex sensors comprise three flex sensors, wherein the electronic cable further includes three or more electrical wires located within a lumen defined by an inner surface of a cable jacket of the electronic cable, wherein the three flex sensors are located within the lumen.

7. The electronic cable of claim 1, wherein the electronic cable has a circular cross-sectional geometry, wherein the at least two flex sensors comprise three flex sensors, wherein the electronic cable further includes three or more electrical wires located within a lumen defined by an inner surface of a cable jacket of the electronic cable, wherein the three flex sensors are embedded within the cable jacket or attached to an outer surface of the cable jacket.

8. The electronic cable of claim 1, wherein the electronic cable has a circular cross-sectional geometry, wherein the at least two flex sensors comprise three flex sensors separated by 120 degrees.

9. A cable deformation monitoring system comprising:
an electronic cable comprising:
  a centrally located piezoelectric fiber sensor having a length longitudinally extending along at least a portion of electronic cable in an axial direction, the piezoelectric fiber sensor is configured to produce voltage readings that are proportional to tensile loads experienced by the electronic cable in the axial direction over time;
  at least two flex sensors arranged radially external to the piezoelectric fiber sensor, each flex sensor having a length longitudinally extending along at least a portion of electronic cable in the axial direction, wherein the at least two flex sensors are configured to output voltage readings that are proportional to lateral loads experienced by the electronic cable in a radial direction over time;
  a battery configured to supply a current to at least the piezoelectric fiber sensor and the at least two flex sensors;
  a memory; and
  a microprocessor configured to store in the memory at least the voltage output readings of the piezoelectric fiber sensor and the at least two flex sensors; and
  a remote monitoring device electronically coupled to the microprocessor, wherein the remote monitoring device is configured to:
    receive the stored voltage output readings of the piezoelectric fiber sensor and the at least two flex sensors; and
    monitor strain of the electronic cable based on the received voltage readings.

10. The cable deformation monitoring system of claim 9, wherein the remote monitoring device monitors strain of the electronic cable by at least:
  measuring tensile and compression strain values of the electronic cable based on the output voltage readings of the piezoelectric fiber sensor;
  measuring bending strain values of the electronic cable based on the output voltage readings of the at least two flex sensors; and
  storing the measured tensile, compression, and bending strain values in a database comprising cable health data, wherein the remote monitoring device includes the database.

11. The cable deformation monitoring system of claim 9, wherein the electronic cable further includes an illumination device, wherein the remote monitoring device monitors the strain of the electronic cable by at least:
  determining whether at least one output voltage reading of the output voltage readings of the at least two flex sensors exceeds a first predetermined maximum voltage, wherein the first predetermined maximum voltage is associated with a predetermined minimum bending radius of the electronic cable;
  determining whether at least one output voltage reading of the output voltage readings of the piezoelectric fiber sensor exceeds a second predetermined maximum voltage, wherein the second predetermined maximum voltage is associated with a predetermined maximum axial strain of the electronic cable; and
  upon determining that the least one output voltage reading of the output voltage readings of the at least two flex sensors exceeds the first predetermined maximum voltage or that the least one output voltage reading of the output voltage readings of the piezoelectric fiber sensor exceeds the second predetermined maximum voltage, transmitting a signal to the microprocessor to the cause illumination device to display a color.

12. The cable deformation monitoring system of claim 9, wherein the electronic cable further has a rectangular cross-sectional geometry, wherein the electronic cable further includes two or more electrical wires located within a lumen defined by an inner surface of a cable jacket of the electronic cable, wherein the at least two flex sensors comprise two flex sensors located within the lumen.

13. The cable deformation monitoring system of claim 9, wherein the electronic cable has a rectangular cross-sectional geometry, wherein the electronic cable further includes two or more electrical wires located within a lumen defined by an inner surface of a cable jacket of the electronic cable, wherein the at least two flex sensors comprise two flex sensors that are embedded within the cable jacket or attached to an outer surface of the cable jacket.

14. The cable deformation monitoring system of claim 9, wherein the electronic cable has a circular cross-sectional geometry, wherein the at least two flex sensors comprise three flex sensors, wherein the electronic cable further includes three or more electrical wires located within a lumen defined by an inner surface of a cable jacket of the electronic cable, wherein the three flex sensors are located within the lumen.

15. The cable deformation monitoring system of claim 9, wherein the electronic cable has a circular cross-sectional geometry, wherein the at least two flex sensors comprise three flex sensors, wherein the electronic cable further includes three or more electrical wires located within a lumen defined by an inner surface of a cable jacket of the electronic cable, wherein the three flex sensors are embedded within the cable jacket or attached to an outer surface of the cable jacket.

16. The cable deformation monitoring system of claim 9, wherein the electronic cable has a circular cross-sectional geometry, wherein the at least two flex sensors comprise three flex sensors separated by 120 degrees.

17. A computer-implemented method for deformation monitoring, the method comprising:
  transmitting, by a remote monitoring device, a request to a microprocessor of an electronic cable, the electronic cable comprising:
    a centrally located piezoelectric fiber sensor having a length longitudinally extending along at least a portion of electronic cable in an axial direction, the piezoelectric fiber sensor is configured to produce voltage readings that are proportional to tensile loads experienced by the electronic cable in the axial direction over time;
    at least two flex sensors arranged radially external to the piezoelectric fiber sensor, each flex sensor having a length longitudinally extending along at least a portion of electronic cable in the axial direction, wherein the at least two flex sensors are configure to output voltage readings that are proportional to lateral loads experienced by the electronic cable in a radial direction over time;
a battery configured to supply a current to at least the piezoelectric fiber sensor and the at least two flex sensors;
a memory; and
the microprocessor, wherein the microprocessor is configured to store in the memory at least the voltage output readings of the piezoelectric fiber sensor and the at least two flex sensors;
receiving by the remote monitoring device, in response to the request, the stored voltage output readings of the piezoelectric fiber sensor and the at least two flex sensors; and
monitoring strain of the electronic cable based on the received voltage readings.

18. The computer-implemented method of claim 17, wherein the electronic cable further includes an illumination device, wherein the remote monitoring device monitors strain of the electronic cable by at least:
determining whether at least one output voltage reading of the output voltage readings of the at least two flex sensors exceeds a first predetermined maximum voltage, wherein the first predetermined maximum voltage is associated with a predetermined minimum bending radius of the electronic cable;
determining whether at least one output voltage reading of the output voltage readings of the piezoelectric fiber sensor exceeds a second predetermined maximum voltage, wherein the second predetermined maximum voltage is associated with a predetermined maximum axial strain of the electronic cable; and
upon determining that the least one output voltage reading of the output voltage readings of the at least two flex sensors exceeds the first predetermined maximum voltage or that the least one output voltage reading of the output voltage readings of the piezoelectric fiber sensor exceeds the second predetermined maximum voltage, transmitting a signal to the microprocessor to the cause illumination device to display a color.

19. The computer-implemented method of claim 17, wherein the electronic cable further has a rectangular cross-sectional geometry, wherein the electronic cable further includes two or more electrical wires located within a lumen defined by an inner surface of a cable jacket of the electronic cable, wherein the at least two flex sensors comprise two flex sensors located within the lumen.

20. The computer-implemented method of claim 17, wherein the electronic cable has a circular cross-sectional geometry, wherein the at least two flex sensors comprise three flex sensors, wherein the electronic cable further includes three or more electrical wires located within a lumen defined by an inner surface of a cable jacket of the electronic cable, wherein the three flex sensors are located within the lumen and are separated by 120 degrees.

* * * * *